US008151280B2

(12) United States Patent
Sather et al.

(10) Patent No.: US 8,151,280 B2
(45) Date of Patent: Apr. 3, 2012

(54) SIMPLE AND DYNAMIC CONFIGURATION OF NETWORK DEVICES

(75) Inventors: Dale A. Sather, Seattle, WA (US); Guillaume Simonnet, Bellevue, WA (US); John M. Gehlsen, Redmond, WA (US); Kosar A. Jaff, Kirkland, WA (US); Ralph A. Lipe, Yarrow Point, WA (US); Roland J. Ayala, Woodinville, WA (US); Shannon J. Chan, Bellevue, WA (US); Thomas Kuehnel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1713 days.

(21) Appl. No.: 10/788,596

(22) Filed: Feb. 27, 2004

(65) Prior Publication Data

US 2005/0108369 A1 May 19, 2005

Related U.S. Application Data

(60) Provisional application No. 60/514,867, filed on Oct. 27, 2003.

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................................ 719/321; 709/221

(58) Field of Classification Search .................. 719/321; 709/221
See application file for complete search history.

(56) References Cited

U.S. PATENT DOCUMENTS

| 5,794,032 | A | 8/1998 | Leyda et al. |
| 5,807,175 | A | 9/1998 | Davis et al. |
| 6,003,065 | A * | 12/1999 | Yan et al. ....................... 709/201 |
| 6,496,839 | B2 | 12/2002 | Cabrera et al. |
| 6,571,277 | B1 | 5/2003 | Daniels-Barnes et al. |
| 6,581,157 | B1 * | 6/2003 | Chiles et al. ...................... 713/1 |
| 6,587,874 | B1 | 7/2003 | Golla et al. |
| 6,665,786 | B2 | 12/2003 | McMichael et al. |
| 6,725,260 | B1 * | 4/2004 | Philyaw ........................ 709/220 |
| 6,823,526 | B2 * | 11/2004 | Howard et al. ................ 719/327 |
| 6,895,588 | B1 * | 5/2005 | Ruberg ......................... 719/321 |

(Continued)

FOREIGN PATENT DOCUMENTS

EP 1223722 A 7/2002

(Continued)

OTHER PUBLICATIONS

Partial European Search Report dated Jan. 27, 2006 for European Patent Application Serial No. RP 04022989, 5 Pages.

(Continued)

*Primary Examiner* — Diem K Cao
(74) *Attorney, Agent, or Firm* — L. Alan Collins; Collins & Collins Intellectual, LLC

(57) ABSTRACT

The present invention relates to a system and method for configuring and managing network devices. The arrival (and departure) of devices on a network can be detected by a monitor. Upon detection, network devices can be simply and dynamically configured with little or no end-user intervention, for instance by automatically loading device drivers and allocating resources for the devices. Furthermore, network devices can be associated with other network devices such as a personal computer to facilitate seamless integration of network devices with a computer operating system.

30 Claims, 12 Drawing Sheets

U.S. PATENT DOCUMENTS

| | | | |
|---|---|---|---|
| 7,283,505 B1 * | 10/2007 | Meenan et al. | 370/338 |
| 7,316,022 B2 * | 1/2008 | Nishio | 719/321 |
| 7,689,673 B2 * | 3/2010 | Kemp et al. | 709/220 |
| 2002/0029256 A1 | 3/2002 | Zintel et al. | |
| 2002/0170951 A1 | 11/2002 | Oshins | |
| 2003/0005100 A1 * | 1/2003 | Barnard et al. | 709/223 |
| 2003/0200289 A1 * | 10/2003 | Kemp et al. | 709/221 |
| 2003/0236889 A1 | 12/2003 | Manion et al. | |
| 2004/0059842 A1 * | 3/2004 | Hanson et al. | 710/8 |
| 2004/0205780 A1 * | 10/2004 | Hara et al. | 719/321 |

FOREIGN PATENT DOCUMENTS

| | | |
|---|---|---|
| JP | 00 269998 | 9/2000 |
| JP | 02 152221 | 11/2000 |
| JP | 00 353079 | 12/2000 |
| JP | 02 007299 | 1/2002 |
| JP | 02 032228 | 1/2002 |
| WO | WO 0126336 A | 4/2001 |
| WO | WO 02067483 A | 8/2002 |

OTHER PUBLICATIONS

T. Fout. Universal Plug and Play Client Support. Microsoft Technet. Aug. 1, 2001.

Jin Nakazawa, et al., A Pluggable Service-to-Service Communication Mechanism for Home Multimedia Networks, Multimedia'02, 2002, pp. 621-630, Juan-les-Pins, France.

Tatsuo Nakajima, A Middleware Component Supporting Flexible User Interaction for Networked Home Appliances, ACM SIGARCH Computer Architecture News, 2001, pp. 68-75, vol. 29-Issue 5, ACM Press, New York, New York, USA.

Goland, "Simple Service Discovery Protocol/1.0", Internet Engineering Task Force (IETF), Oct. 28, 1999.

Australian Office Action dated Jun. 16, 2010.

Office Action mailed Oct. 22, 2010 in Japanese Patent Application No. 2004-312787.

EP Partial Search Report, Ref. EP32426IMHdix, for Application No. 10191214.5-2413, date Mar. 8, 2011.

Japanese Office Action mailed Jun. 15, 2010.

Mexican Office Action mailed Sep. 27, 2010.

Kashiwano, M., "Basics of WDM and Structure of USB Driver," Interface 27(1):81-93,CQ Publishing Co. Ltd., Dec. 1, 2000.

EP Search Report Ref. EP32426IMHdix, for Application No. 10191214.5-2413/2312436, date Aug. 23, 2011.

EP Office Action, Ref. EP32426RK900, for Application No. 04 022 989.0-2413, date Nov. 18, 2008.

AU Office Action, Ref. 12511450/DBW, for Application No. 2004218618, date Oct. 13, 2009.

* cited by examiner

SIMPLE AND DYNAMIC CONFIGURATION OF NETWORK DEVICES

CROSS-REFERENCE TO RELATED APPLICATIONS

This application claims the benefit of U.S. Provisional Application Ser. No. 60/514,867, entitled "Integration of UPnP Devices as PnP Devices within Windows," filed Oct. 27, 2003, the entirety of which is incorporated herein by reference.

TECHNICAL FIELD

The present invention relates generally to computers and more particularly toward control and management of networked devices.

BACKGROUND

Plug and Play (PnP) technology allows locally connected devices to be automatically detected and configured to operate on a computer. PnP functionality is integrated into a computer's operating system to allow a computer to detect a newly connected peripheral device as well as install and register such device with a computer system. Prior to PnP technology, it was necessary for users to manually set up peripheral devices, for instance, by specifying communication channels and interrupt request values (IRQs). PnP allows a computer to detect newly connected devices upon system boot, identifies the device and automatically assigns resources, and configures the device to work with the computer system. Additionally, under PnP, operating systems can detect peripheral devices that are added or disconnected to a hot bus (e.g., Universal Serial Bus (USB), PCMCIA bus . . . ) after system boot. Devices connected to local or hot buses can be available immediately for use with the computer system after they are set up a first time. The operating system may contain particular information and drivers with respect to particular devices. In such case, the operating system can simply automatically set up a device upon arrival to the system. In other instances, drivers and information may have to be retrieved from alternate sources such as a CD-ROM or the Internet to facilitate setting up a device. Once a device is set up, the settings can be saved in a registry so that if a device is removed and later reconnected the system can retrieve the device settings and load the appropriate driver to enable interaction between the operating system and the device.

Networked devices both wired and wireless are becoming increasingly prevalent. Conventionally, a number of different networking technologies have been employed for managing and controlling networked devices. For example, network printers are commonly implemented utilizing network-printing protocols over Ethernet. Another example is the X10 network protocol, which is utilized to remotely control devices (e.g., light switches, video cameras . . . ) using a power line network. While these technologies allow devices to be accessed and controlled remotely, many consumers have not availed themselves of the benefit of network devices. One possible reason that consumers have not taken advantage of network devices, may be that potential users perceive setting up a home network (e.g., for automation, network computing, or network printing) as simply too complicated.

Accordingly, a simple and efficient system and method for connecting and controlling networked devices is desired. Such a system and method would be advantageous in ensuring that networked devices are just as easy to find, associate and use as locally connected devices utilizing PnP.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

A network device configuration system and method are disclosed. The network device configuration system dynamically and automatically installs or configures network devices thereby reducing or altogether eliminating the burden on end-users. According to one aspect of the present invention a monitor component is provided to detect the arrival and departure of network devices. To facilitate such functionality the monitor component can utilize a plurality of discovery protocols such as Simple Service Discovery Protocol (SSDP) and Web Service Discovery (WS-Discovery) Protocol to actively seek out existing network devices or monitor a network for newly arriving network devices.

According to another aspect of the subject invention, network devices can be associated with one or more other network devices such as a personal computer (e.g., desktop, laptop, personal digital assistant (PDA). Hence, the subject invention can be viewed, according to one aspect, as a collection of components for enabling peripherals to be remotely connected to a personal computer (PC). Therefore, the system can utilize a computers local area network connection (wired or wireless) for tunneling I/O. Furthermore, according to another aspect of the invention the system disclosed herein can be configured to extend the PC peripheral space to non-conventional devices (e.g., consumer electronics, home automation . . . ). Accordingly, the personal computer can act to manage and control a plethora of network devices including non-traditional devices.

According to another aspect of the subject invention, an operating system's existing plug and play system established for directly connected peripherals can be leveraged to enable simple and robust configuration of network devices with little or no user interaction. To that end, the present invention, according to an aspect thereof, enables Universal Plug-and-Play (UPnP™) compliant devices to be integrated into an operating system Plug-and-Play subsystem. UPnP™ is merely a wire protocol or architecture defining how information is to be transferred among networked devices.

In addition to device discovery and association, several aspects of the subject invention also support channel security, authentication, device control and streaming or isochronous behavior.

According to yet another aspect of the invention a graphical user interface is provided to facilitate robust network device management and configuration. The interface provides a graphical mechanism for associating, searching, and organizing local network devices.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope or spirit of the subject invention.

Figure 1:
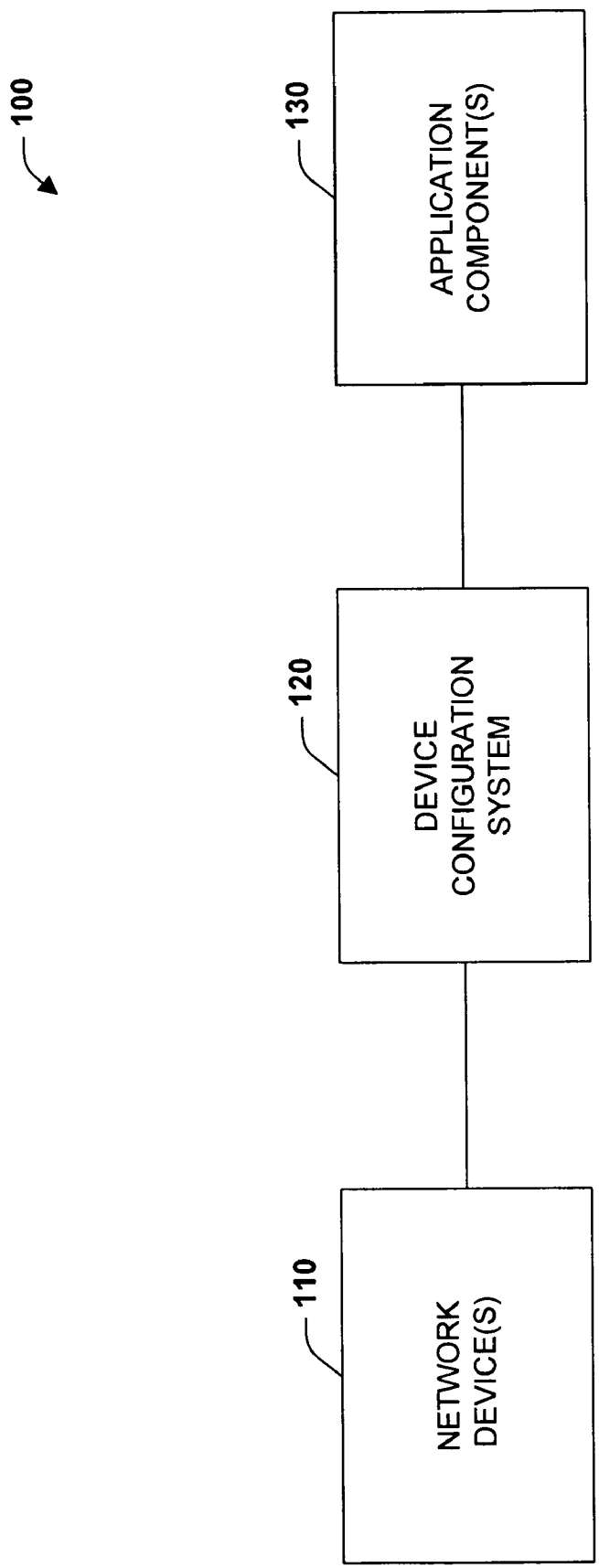
FIG. 1 is a schematic block diagram of a network device interaction system in accordance with an aspect of the present invention.

Turning to FIG. 1, a network device interaction system 100 is depicted in accordance with an aspect of the subject invention. The system 100 comprises application component(s) 110, device configuration system 120, and network device(s) 130. Application component(s) 110 can be any software program including both system and application software (e.g., operating system, word processing application . . . ). Valuable application components 110 often utilize peripheral networked devices. For example, a word processing program can utilize a network printer to print documents and/or reports. However, it should be noted that network device(s) 130 could correspond to any physical entity that can be connected to a network. Accordingly, typical network devices can include such things as printers, scanners, copiers, personal digital assistants (PDAs), and computers of all types (e.g., desktop, laptop, pocket PC . . . ). Nevertheless, network devices can also include other types of consumer electronics including but not limited to clocks, dishwashers, refrigerators, electronic picture frames, washers, dryers, light switches, a thermostat, television sets, set top boxes, DVD players, and gaming machines or consoles (e.g. XBox). Application component(s) 110 can seek to provide I/O control commands to network devices. For example, when a user arrives home from work at 5:30 p.m. turn the kitchen lights on, set the thermostat to 70° Fahrenheit, turn on the television, and tune in to a particular channel. To enable communication between application component(s) 110 and network devices 130 the network devices must be configured to function with the application components.

Device configuration system 120 configures network devices 110 to operate with application components 130. According to one aspect of the subject invention the configuration system 120 can load device drivers. Drivers are software components that facilitate communication with associated devices. Network devices have their own specialized instructions or command set while application programs employ different commands than devices to specify the same functionality. Accordingly, a device driver component acts as a translator by mapping application commands to particular device instructions. Device drivers (also referred to herein as device driver packages) can be loaded from a computer's local data store, downloaded from the Internet, retrieved from a computer readable media (e.g., CD-ROM, floppy disk), or retrieved from a network device. Configuration system 120 can also set registry keys or the like in computer systems. A registry can simply be a database containing keys (files) holding configuration information about applications. For example, keys can be associated with user preferences, file associations, objects links, and settings for applications among other things. Configuration system 120 can also automatically and dynamically allocate resources for a network device(s) 110 for example selecting and setting an interrupt request line (IRQ) for requesting service from a central processing unit (CPU), selecting and setting a communication channel and a dynamic memory access (DMA) channel, as well as allocating a portion of memory for use by the device.

Furthermore, it should be appreciated that the configuration system 120 can also execute tasks such as updating device firmware to a newer firmware version packaged with the device driver. Once a network device is installed and configured (e.g., by copying drivers to the device), associated application components can utilize the devices. After the initial configuration, network device settings (e.g., IRQ, DMA channel, allocated memory . . . ) can be saved, for instance in a registry or elsewhere. If and when a device departs from the network and then later reconnects, the saved information can be located, retrieved, and utilized by the configuration system 120 to expeditiously and automatically re-enable the device to operate with particular application components 130 on a computer system for example.

Figure 2:
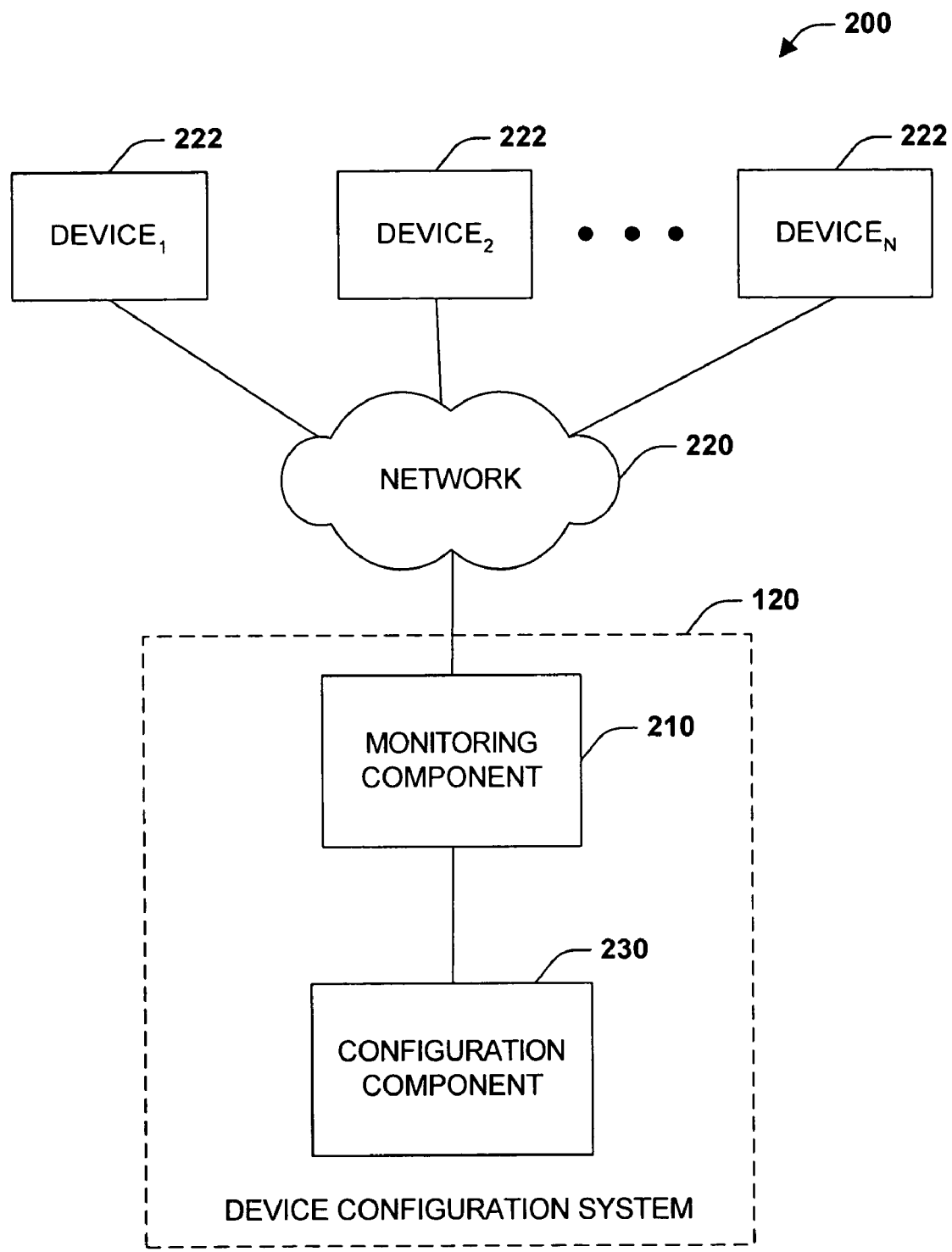
FIG. 2 is a schematic block diagram of a network device configuration system in accordance with an aspect of the present invention.

Moving on to FIG. 2, a network device configuration system 200 is disclosed in accordance with an aspect of the subject invention. Configuration system 200 comprises a monitor component 210, a network 220, network device(s) 222 (DEVICE$_1$ through DEVICE$_N$, where N is an integer greater than or equal to 1), and configuration component 230. Monitor component 210 detects the arrival and/or departure of a network device 222. Upon arrival, a network device 222 is detected and configuration component 230 automatically configures the device 222 to operate on a computer system. For example, configuration component 230 can load a device driver or driver package, dedicate a communication channel, save a registry key, and allocate memory for use with the device 222. Upon departure, the configuration component 230 can free up memory locations and the communication channel for use by other devices 222. Subsequently, upon reconnection of a network device the configuration component 230 can automatically and expeditiously configure the device to operate properly. The system 210 thereby facilitates seamless integration of network devices 222 into a computer system. Through this integration, users can more easily configure, manage, and access networked devices 222 from their personal computer, for example. Thus, end-users may be able to purchase networked devices and connect them to their home or enterprise network with little or no configuration. The network devices will simply work when connected to a network.

Monitor component 210 queries a network 220 to analyze the network devices 222 connected thereto. Network 220 can be a wired and/or wireless local area network (LAN). A LAN is a network of moderate geographic size that is often used for office buildings, homes, warehouses, and campuses to name but a few. Network devices 222 can be any electronic or like device capable of being networked (e.g., alarm clock, phone, camera, television set, refrigerator, washer, dryer, DVD player, digital audio receiver (DAR), personal digital assistant (PDA), computer (desktop, laptop, palmtop), pager, mobile phone, printer, scanner, copier, set-top box, gaming machine, electronic picture . . . ). Networked devices 222 can communicate with network 220 either via wire (e.g., twisted pair, optical fiber, coaxial cable, power lines . . . ) and/or wirelessly (e.g., IEEE 802.11a, 802.11b, 802.11g, infra red, radio, Bluetooth, satellite . . . ). Monitor component 210 can detect the arrival and/or departure of a network device 222 by utilizing or querying one or more discovery protocols or plug-ins. For instance, the monitor component can employ Simple Service Discovery Protocol (SSDP) to detect UPnP devices and Web Services Discovery (WS discovery) Protocol to identify WS-Discovery/WS-Description devices. It should be appreciated that discovery protocols can be used in either an active or a passive manner or a combination thereof. When used in an active manner a discovery protocol searches for existing devices connected to the network 220. In a passive monitoring system the discovery protocol can simply listen for a newly arrived device announcing its presence on the network 220. Furthermore, these and other protocols can not only indicate the presence of a networked device, but also collect metadata about the devices (e.g., utilizing SSDP, HTTP, and XML parsing) that can be utilized in configuring the device(s).

Configuration component 230 receives notification and metadata concerning connected network devices 222 from the monitor component 210. Network device metadata can include but is not limited to information such as hardware id, compatibility ids, instance id, friendly name, transport addresses, authentication parameters, and parent instance id. The hardware id and compatibility ids can be used by the configuration component 230 to identify the file(s) to use for device installation. The instance id uniquely identifies the network device. The friendly name (e.g., master bedroom television) can be employed in user interactions with the device. Transport addresses can be utilized by drivers and middleware to contact the device. Authentication parameters can be used to determine what for of authentication must be performed (discussed in further detail in later sections). Upon notification of a recently added network device and receipt of associated metadata, the configuration component can proceed to automatically install and configure the network device. Using metadata information such as hardware id and compatibility ids the configuration component can locate a device file on a computer system and retrieve configuration information including but not limited to driver files and registry keys to be copied. If the computer system has the appropriate driver files, the files will automatically be loaded. If the files are not locatable on the computer system (e.g., hard drive) then the driver files can be downloaded from the Internet (if connected) or the user may be asked to insert a computer readable media (e.g., compact disk (CD) or floppy disk) that contains the desired files. Subsequently the driver files are loaded and device properties and settings are configured (e.g., assign system resources, IRQs, communication ports . . . ).

Figure 3:
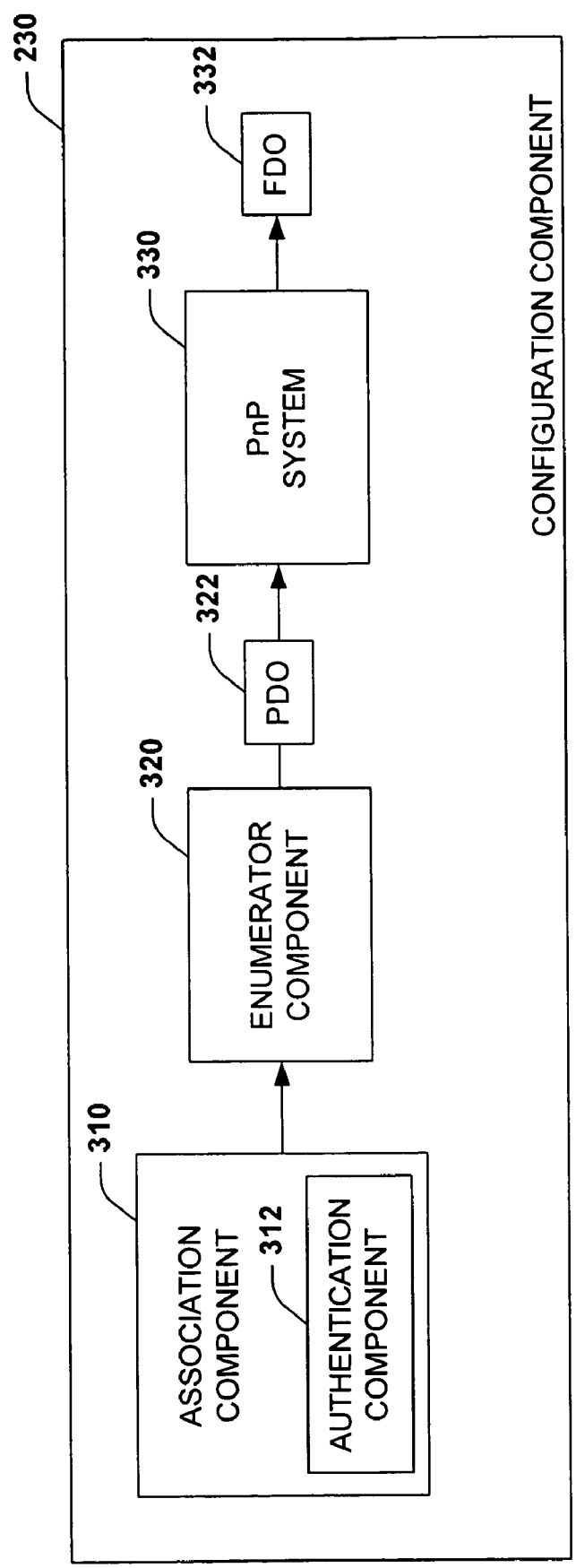
FIG. 3 is a schematic block diagram of a configuration component in accordance with an aspect of the subject invention.

FIG. 3 illustrates a configuration component 230 in accordance with an aspect of the subject invention. Configuration component 230 contains an association component 310, an enumeration component 320, and a PnP system 330 as well as a PDO component 322 and a FDO component 332. Association component 310 establishes a relationship (e.g., master-slave) between a device and a computer. This relationship is naturally established for local devices by virtue of a physical connection; however this is not applicable to attached network devices. Additionally, association component 310 can include an authentication component 312 that can prevent unauthorized access to a device. Authentication component 312 provides a security mechanism to ensure that only associated devices have access to a network device. For example, in order for a device to be associated a user must enter a personal identification number (PIN) or establish trust through some other mechanism. Additional security mechanism provided by authentication component 312 such as certificates are discussed in later sections infra. Once successfully associated, a device can subsequently authenticate itself without user identification. Enumeration component 320 generates a physical device object (PDO) component 322 after a device is discovered and associated. The PDO component 322 represents the device to various drivers and software components. The PDO component 322 can supply software components, inter alia, information concerning a device's state (e.g., on, off, suspended). Accordingly, a PDO component 322 abstracts device hardware I/O from various other software components (e.g., operating system) and facilitates interaction with a device. The enumerator component 320 passes the created PDO component 322 to the Plug-n-Play (PnP) system 330. PnP system 330 coordinates interactions amongst hardware devices, device drivers, and computer operating system software. Upon receipt of the PDO component 322, the PnP system 330 can retrieve information stored in the PDO regarding a particular network device and use such unique information to locate a device driver associated with the PDO component 322. Once the driver is located, it is loaded or executed and produces a functional device object component 332 which can be utilized to manage the functionality of a network device. Accordingly, application can interact with the functional device object component to specify device operations.

Figure 4:
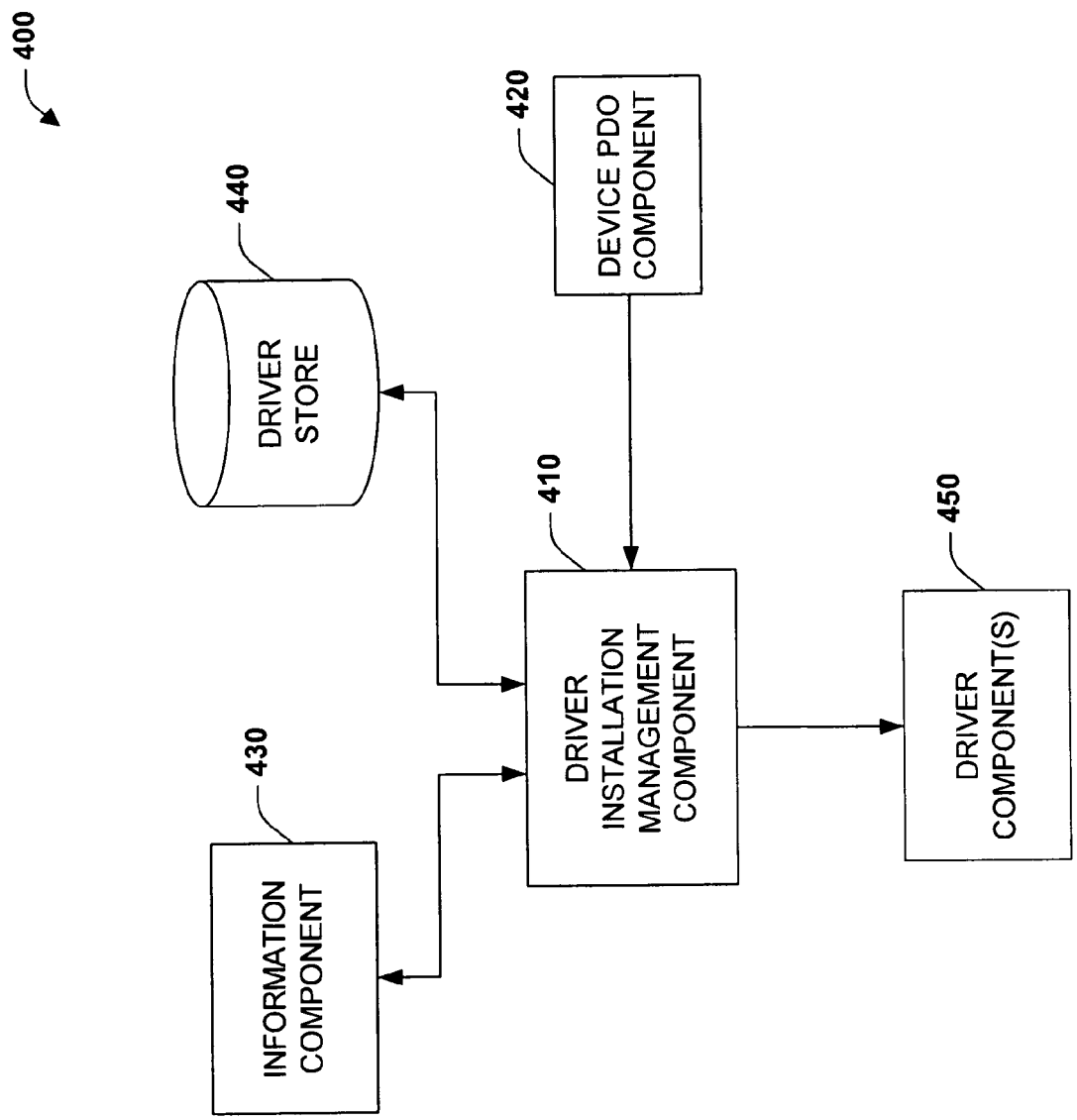
FIG. 4 is a schematic block diagram of a system for locating device drivers in accordance with an aspect of the present invention.

Turning to FIG. 4 a system 400 for locating a network device driver is illustrated in accordance with an aspect of the present invention. System 400 includes a driver installation management component 410, a device PDO component 420, an information component 430, a driver store 440, and a located driver component 450. Driver component 450 contains information relating to the proper installation and configuration of a network device associated therewith. Driver components 450 can include dynamically linked libraries (DLLs), installers, co-installers, applications or any other type of file. Driver installation management component 410 retrieves the driver component(s) 450 associated with a particular device. Driver installation management component 410 receives or retrieves a device PDO component 420. The device PDO component 420, as discussed previously, can be generated upon detection of the arrival of a device on a network. The PDO component 420 represents the device on the network bus. The PDO component can include unique information regarding a device such as a hardware id and/or a compatibility id. Upon receipt of the PDO component 420, installation management component 410 can retrieve such unique device information such as the hardware id from the PDO component 420. The driver installation management component 410 can then utilize the unique information and the information component 430 to determine the appropriate configuration for a device. Information component 410 (e.g., .INF file or database) can act as a repository for device configuration information. Configuration information can include but is not limited to driver components and registry keys. Such configuration information can be arranged in a manner that facilitates expeditious location of information. For example, configuration can be stored associated with a hardware id. Accordingly, installation management component 410 can utilize or supply the retrieved hardware id to the information component 430 can retrieve the appropriate configuration information for a device. For instance, installation management component can be notified of the identity of an appropriate driver component. The installation management component can subsequently retrieve a driver from a driver store 440. Driver store 440 can be located locally or remotely from a computer. In some cases a computer can store such drivers locally, however one cannot guarantee that all drivers for every possible network device will be stored locally, for example by an operating system manufacturer. Accordingly, driver store can be located remotely for example on a central server or on a server associated with the device manufacturer. The driver installation management component 410 is operable to retrieve driver components and other installation or configuration information (e.g., patches, registry keys) from remotely located servers. Furthermore, according to an aspect of the present invention, installation management component 410 can locate drivers store on local network devices. For example, another computer on a network could have the necessary driver component(s), while the computer associated with the device being installed does not. In such a situation the management component 410 can receive or retrieve such driver component(s) from the other computer. Additionally, it should be noted that the device being installed or configured can store the necessary drivers locally and the driver installation management component can retrieve driver component(s) therefrom. Furthermore, it should also be appreciated that the driver store 440 can also be a computer readable medium (e.g., CD, DVD, floppy disk, memory card . . . ) housing the appropriate driver component(s) 450.

Figure 5:
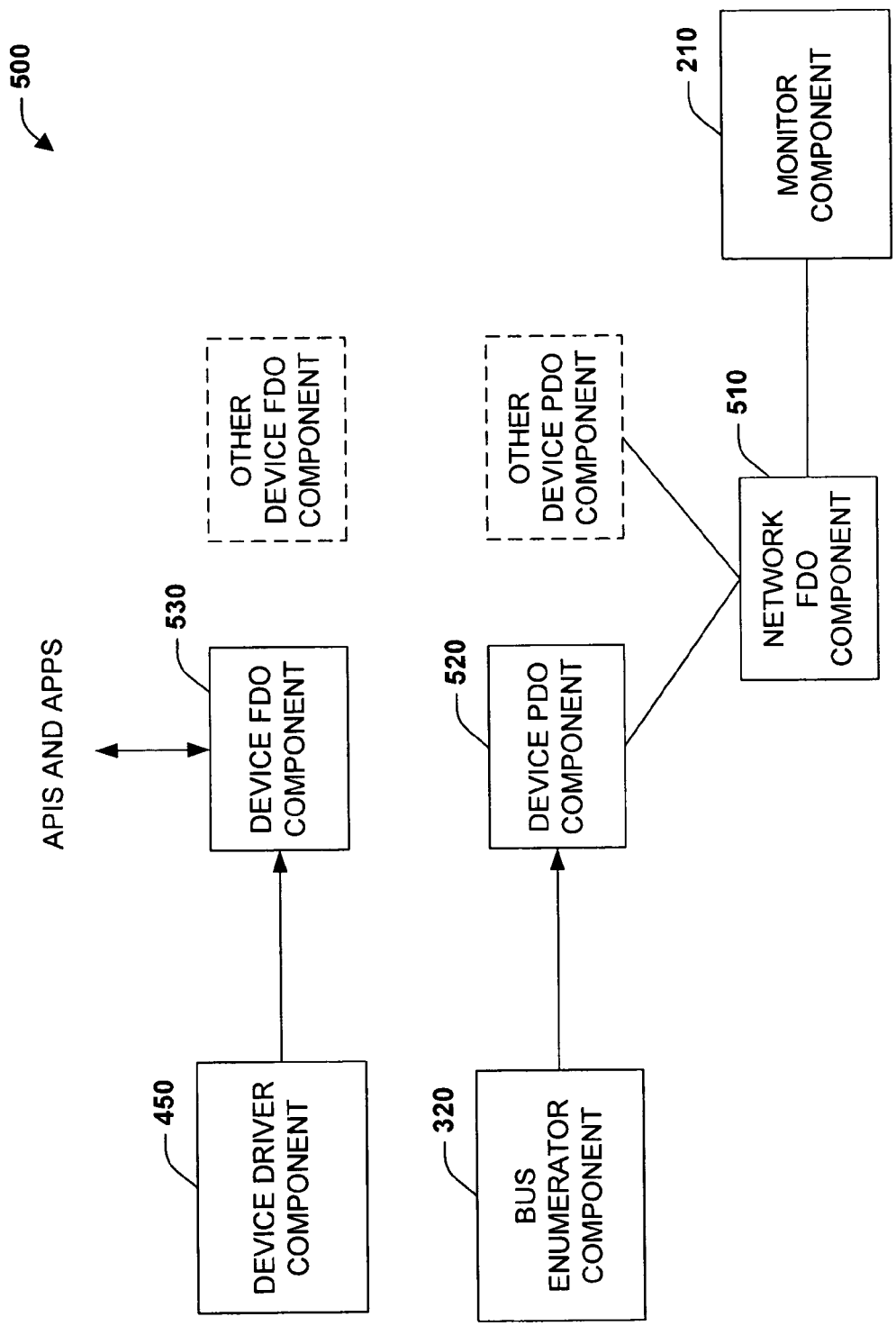
FIG. 5 is a schematic block diagram of a system for dynamically configuring network devices in accordance with an aspect of the subject invention.

FIG. 5 illustrates a system 500 for dynamically configuring a network device in accordance with an aspect of the subject invention. System 500 comprises a monitor component 210, a network functional device object (network FDO) component 510, a bus enumerator component 320, a network device physical device object (device PDO) 520, a device driver component 450, and a network device functional device object (device FDO) component 530. Monitor component 210 scrutinizes a network to determine newly added or departing network devices. To facilitate such functionality, a network FDO component 510 can be provided. Network FDO component 510 can expose network functionality to the monitor component 510. For example, network FDO component 510 can enable discovery protocol to scan network nodes. Upon discovering a new network device, a bus enumerator component 320 can be employed to generate a device PDO component 530. Device PDO component 530 can comprise information describing a network device and the device state. A device installation management component 410 (FIG. 4) can then utilize the device PDO component 530 to locate and retrieve a device driver component(s) 450 associated with the network device and accordingly the device PDO component 530. The device driver component 450 can generate a device FDO component associated with the network device. A device FDO component 530 can expose the functionality of a network device to a one or more applications or application programming interfaces (APIs) that desired to control the network device. For example, if the network device is an alarm clock, the device FDO component 530 can expose services for setting the time and setting an alarm. Accordingly, an application can be developed that utilized the device FDO component 530 to automatically reset the time on the alarm clock to the current time after the detected occurrence of power outage.

Figure 6:
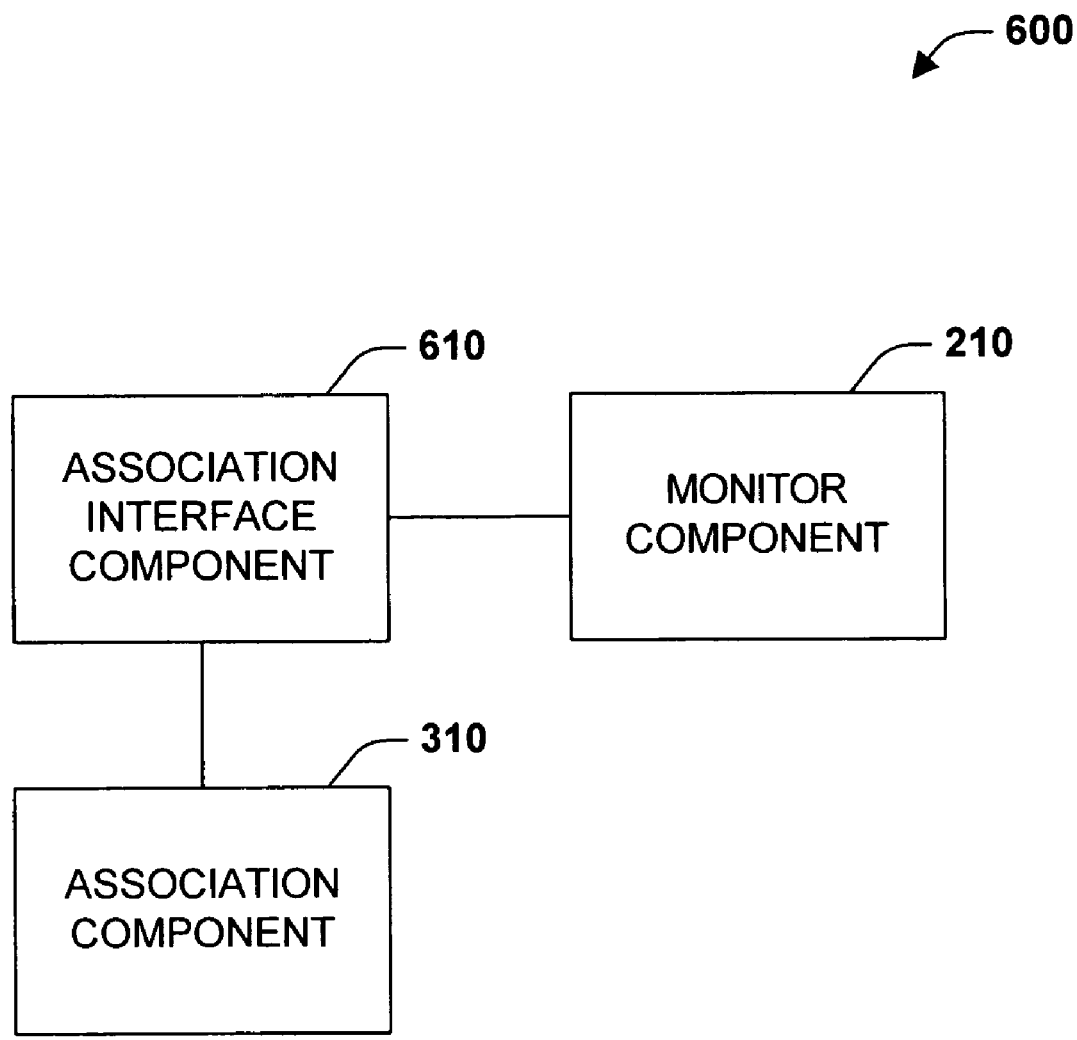
FIG. 6 is a schematic block diagram of a system for associating devices in accordance with an aspect of the present invention.

Turning to FIG. 6, a system 600 for associating network devices in depicted in accordance with an aspect of the present invention. System 600 includes a monitor component 210, association interface component 610, and association component 310. Devices connected locally via universal serial bus (USB) or some other bus (e.g., PCI, PMCIA) are inherently associated with a computer. Thus, if a printer is connected directly to a computer by way of a USB cable it is associated with that computer. The same is not true for network devices. Accordingly, when a network device is connected to the network a user can be given the opportunity to select an associated network device such as a computer. After detecting the arrival of a new network device on a network (e.g., utilizing network discovery protocols) monitor component 210 can employ association interface component 610 to determine another network device with which to associate the newly arrived device. Association interface component 610 can also be utilized to collect authentication data out-of-band with respect to the network. For example, in order to associate a printer, a user might need to verify that such association should be done by entering a 4-digit number. This is an example of using shared key. However, a subsequent bootstrapping process could exchange more robust secrets that could be employed to establish secure, authenticated channels. For instance, one could employ certificate-based credentials such as a device certificate (e.g., trusted certificated authority (CA), manufacturer, network administrator, self signed) or computer certificates (e.g., trusted CA, network administrator, self signed). Furthermore, where security is a real issue a secure channel or virtual cable can be established via encryption. The association interface component 610 can depend on the negotiated authentication method between device and computer. However, the association interface component 610, according to an aspect of the invention, can be designed to be as uniform as possible across all authentication methods and protocols. According to an aspect of the present invention, the association interface component can be a graphical user interface as is known the art. In particular, a graphical user interface can have graphical objects (e.g., buttons, menus, progress bar . . . ) for, inter alia, user selections including but not limited to association of discovered device(s). However, it should be appreciated that the interface could also simply be text based or a combination of graphics and text. Association interface component 610 can provide association information to the association component to store and properly executed; Furthermore, it should be appreciated that a user can go through some steps upon initial authentication. Once done successfully, the device can authenticate itself without additional user intervention in the future. The device can be considered trusted and the respective credentials can be stored on the associated computer, for example, and the device. Thus, if monitor component 210 determines that the device has not been seen before, for example by checking its own internal database or that of association component 310 then association interface component 610 can be employed to set up one or more associations. However, if the device is marked "trusted" (i.e., it was previously successfully authenticated) then no user interaction will be required, at least because the device was successfully authenticated and authorized at a previous time. Such a situation can occur when a network device is installed and configured, removed from the network and then later reconnected. On the other hand if the device is found marked as distrusted or failed authentication or installation the device can be marked ignored and any association proposal abandoned.

Furthermore, it should be appreciated that device sharing may be enabled, for instance with two or more computers sharing a network device (e.g., printer, camera . . . ). The system of the present invention can also be configured to allow device associations to be changed on demand (e.g., for multifunction printers and cameras). Still further yet, the system can be configured to perform device aggregation. For instance, multiple devices can be aggregated to create richer end-user experiences. Thus, multiple web cameras could be aggregated into a single larger virtual web camera (i.e., with a single large image formed from the smaller individual web camera images).

Figure 7:
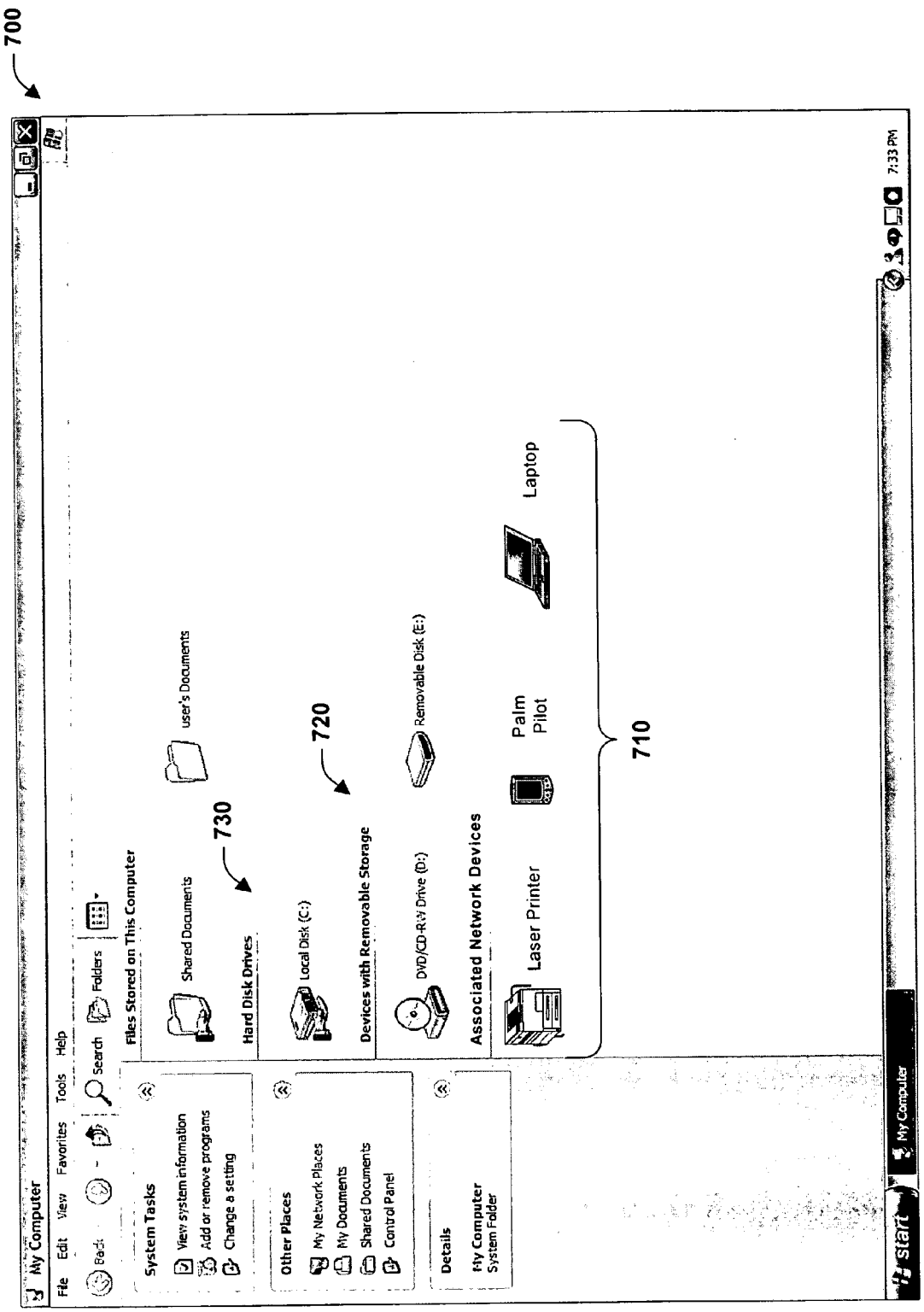
FIG. 7 is an illustration of an exemplary graphical user interface in accordance with an aspect of the present invention.

Turning to FIG. 7, an exemplary graphical user interface 700 is depicted in accordance with an aspect of the subject invention. If network devices are associated with a computer than an operating system can display to a user the available network devices (e.g., those that are online). Interface 700 illustrates one manner in which network devices can be displayed to a user. Network devices 710 can be displayed under an associated network device header in a windowpane along with other information such as locally removable storage devices 720 and hard disk 730. The displayed icons indicate that on this exemplary system network devices include a printer, a palm pilot, and a laptop. It should be appreciated that network devices can be shown individually or logically grouped (e.g., printer group, camera group). Furthermore, device icons can then be selected using a pointing device (e.g., mouse, touch pad, trackball, touch screen, stylus . . . ). Upon selection, device properties can be displayed including but not limited to name, type, model, location, and status. The displayed icons can act as proxies for network devices, accordingly device associations can be manipulated for example by deleting or removing a device icon. Additionally, it should be appreciated that the graphical user interface 700 can support ghosting and un-ghosting. For example, when a user takes his laptop from home to the office then that device will no longer be available to the local home network. Consequently, the user interface 700 can show the network device in the home network but give it a ghosted visual appearance. When the user brings his laptop back within the home network the icon can be un-ghosted to indicate the laptop's availability to the network. Still further yet the interface 700 can provide a mechanism to facilitate searching for network devices (not shown). For example, assume a user has just bought a new Bluetooth mobile phone and wants to pair or associate it with his personal computer. He accesses the user interface but does not see the device displayed. The user can utilize a search mechanism or task to locate phone. The system can then begin to populate the interface with available devices apply a filter to ensure that just mobile phones are displayed. Thereafter, the user can locate his phone in the search results can add it to his default devices, for example.

Interface 700 has been presented to facilitate discussion of a graphical user interface. It should be noted and appreciated by those of skill in the art that there are various ways of designing a graphical interface. For example, network devices can be displayed in a carousel arrangement where network devices rotate or pivot into view upon selection. Accordingly, the disclose interface is exemplary and is not meant in any way as a limitation on the scope of the present invention.

Figure 8:
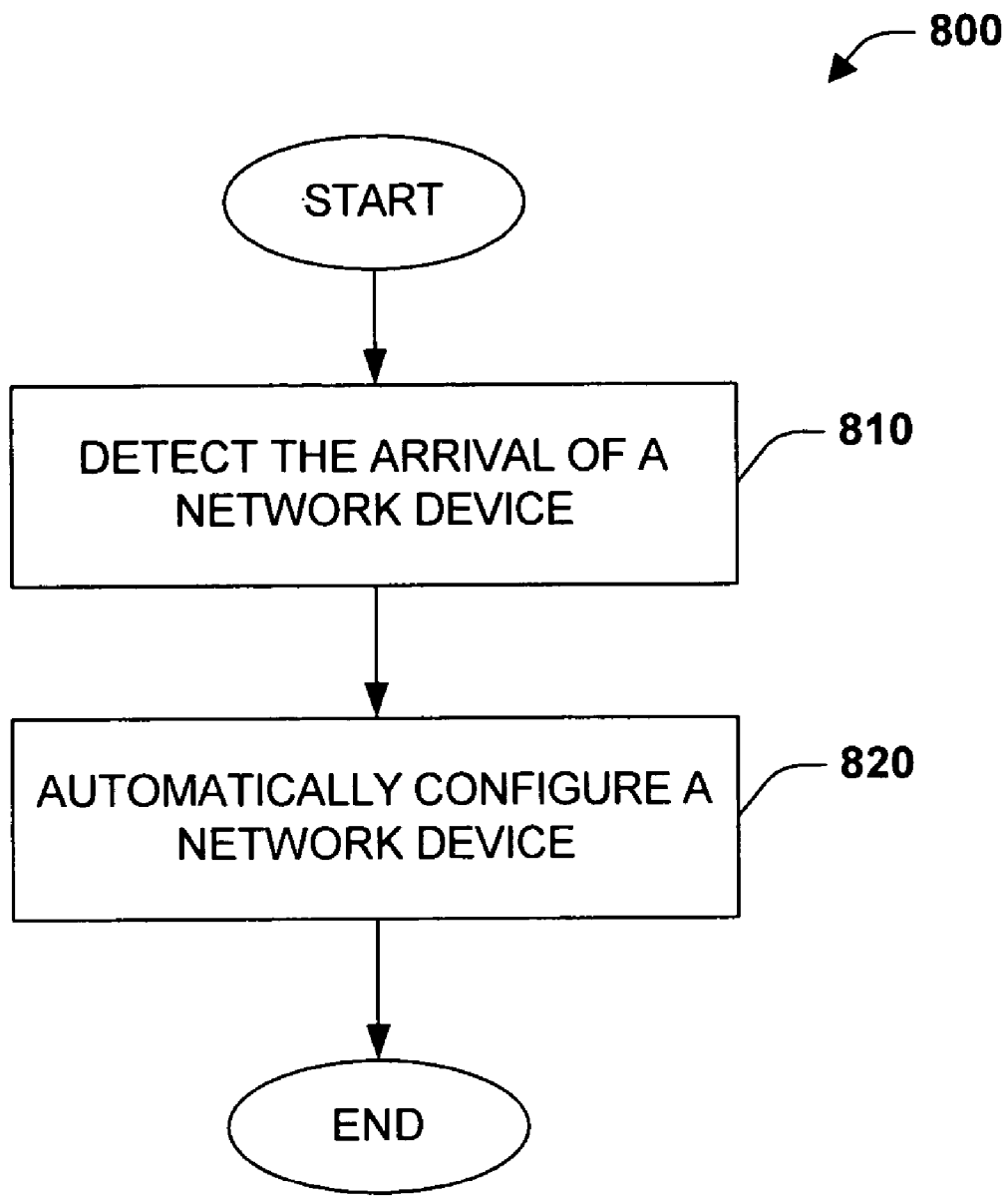
FIG. 8 is a flow chart diagram illustrating a methodology for interacting with network devices in accordance with an aspect of the subject invention.
Figure 9:
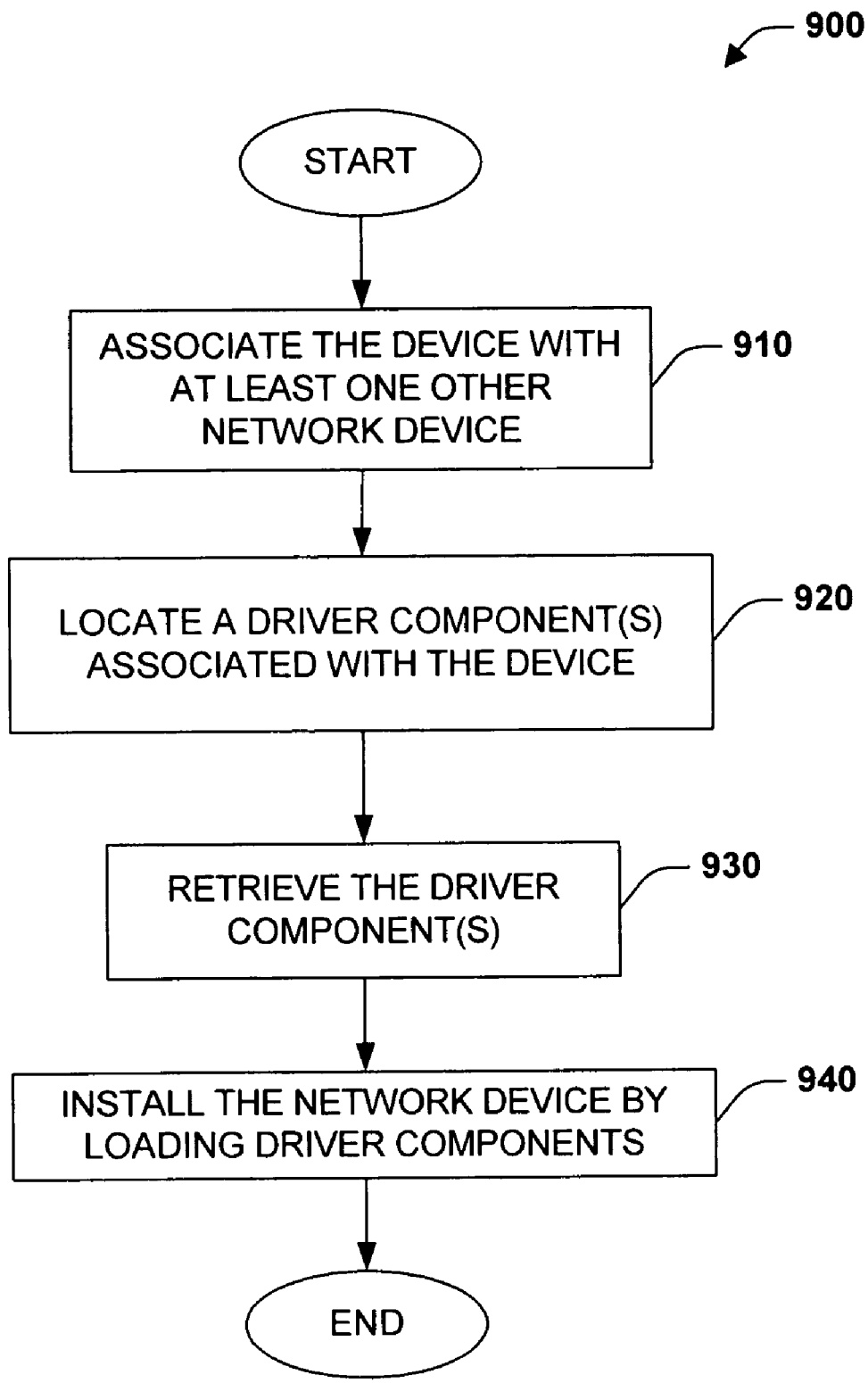
FIG. 9 is a flow chart diagram depicting a methodology for configuring network devices in accordance with an aspect of the present invention.
Figure 10:
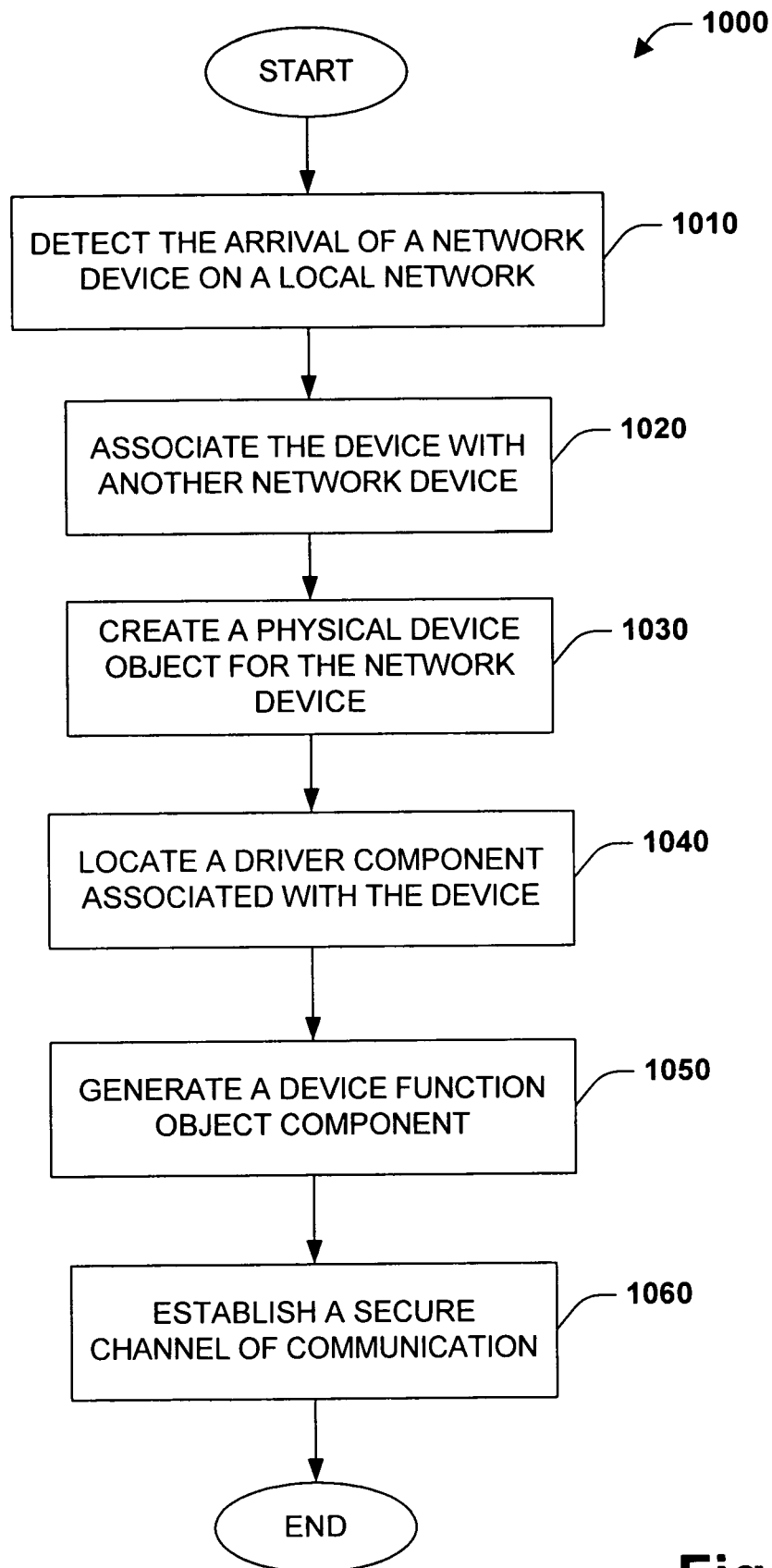
FIG. 10 is a flow chart diagram depicting a methodology for configuring network devices in accordance with an aspect of the present invention.

In view of the exemplary system(s) described supra, a methodology that may be implemented in accordance with the present invention will be better appreciated with reference to the flow charts of FIGS. 8-10. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

FIG. 8 depicts a methodology 800 for interacting with a network device in accordance with an aspect of the subject invention. At 810, the arrival of a network device is detected. A network device arrives in a network when it is either physically connected to a network via wire (e.g., twisted pair, optical fiber, coaxial cable, power lines . . . ) or comes within the geographical distance of a wireless network (e.g., IEEE 802.11a, 802.11b, 802.11g, infra red, radio, Bluetooth, satellite . . . ). Detection of a network device can be accomplished utilizing such discovery protocols as Simple Service Discovery Protocol (SSDP) and Web Services Discovery (WS-Discovery) Protocol. Furthermore, detection can either be active or passive. For instance, in an active scenario a signal can be broadcast over the network demanding a response from network devices. In a passive situation the discovery protocol can simply listen to the network and await notification by a device of its arrival. At 830, the network device can be automatically configured. Generally speaking configuration can comprise associating a device with one or more network devices and loading a driver component associated with the particular network device. According to one aspect of the invention a device can associate with a personal computer, which automatically and dynamically loads a driver component to expose the device's functionality to the computer user. For example, if a new network printer is connected to a local network, its arrival can be detected by one of a multitude of discovery protocols. Subsequently the printer can be associated with a computer for instance. Next, the computer can load the driver from a local store or retrieve it from a remote store (e.g., web server) and load it. The result is that the computer can utilize the printer with little or no intervention from a user.

FIG. 9 illustrates a methodology 900 for configuring a network device in accordance with an aspect of the present invention. At 910, the network device is associated with one or more other network devices. According to one aspect of the invention the network device is associated with a personal computer. At 920, a driver component(s) associated with the network device is located. A driver component contains information relating to the proper installation and configuration of a network device associated therewith. Driver components can include dynamically linked libraries (DLLs), installers, co-installers, applications or any other type of file. A driver can be located with the associated network device such as in a personal computer's local store, on a remote server (e.g., manufacture's web server, centralized driver server), in a local store associated with the device to be configured or within any other network device. The driver component(s) are retrieved, at 930. For example, the driver components can be downloaded from a remote server or retrieved from a network device. At 940, the driver component(s) are loaded or installed to configure the network device and expose the device's functionality to associated network devices.

Turning to FIG. 10, a flow chart is illustrated depicting a methodology 1000 for configuring and installing network devices in accordance with an aspect of the present invention. At 1010, the arrival of a network device is detected. As discussed supra, a network can be scrutinized to determine the arrival of devices utilizing one several discovery protocols such as SSDP or WS Discovery. Furthermore, detection can either be active or passive. At 1020, the device is associated with one or more other active network devices (e.g., a personal computer). At 1030, a physical device object component is generated. A physical device object component represents the network device to drivers and other software. A physical device object provides information including but not limited to vendor name, device friendly name, and device id. The provided information is sufficient to locate an associated driver component. At 1040, a driver component associated with the network device is located based at least in part upon the information provided by the physical device object component. At 1050, the driver component is utilized to generate a functional device object component that exposes the device's functionality to applications and/or application programming interfaces (APIs). Finally, at 1060, a secure channel of communication is established between the network device and associated network devices (e.g., personal computer). For example, various encryption techniques can be employed to ensure the security of communication.

Figure 11:
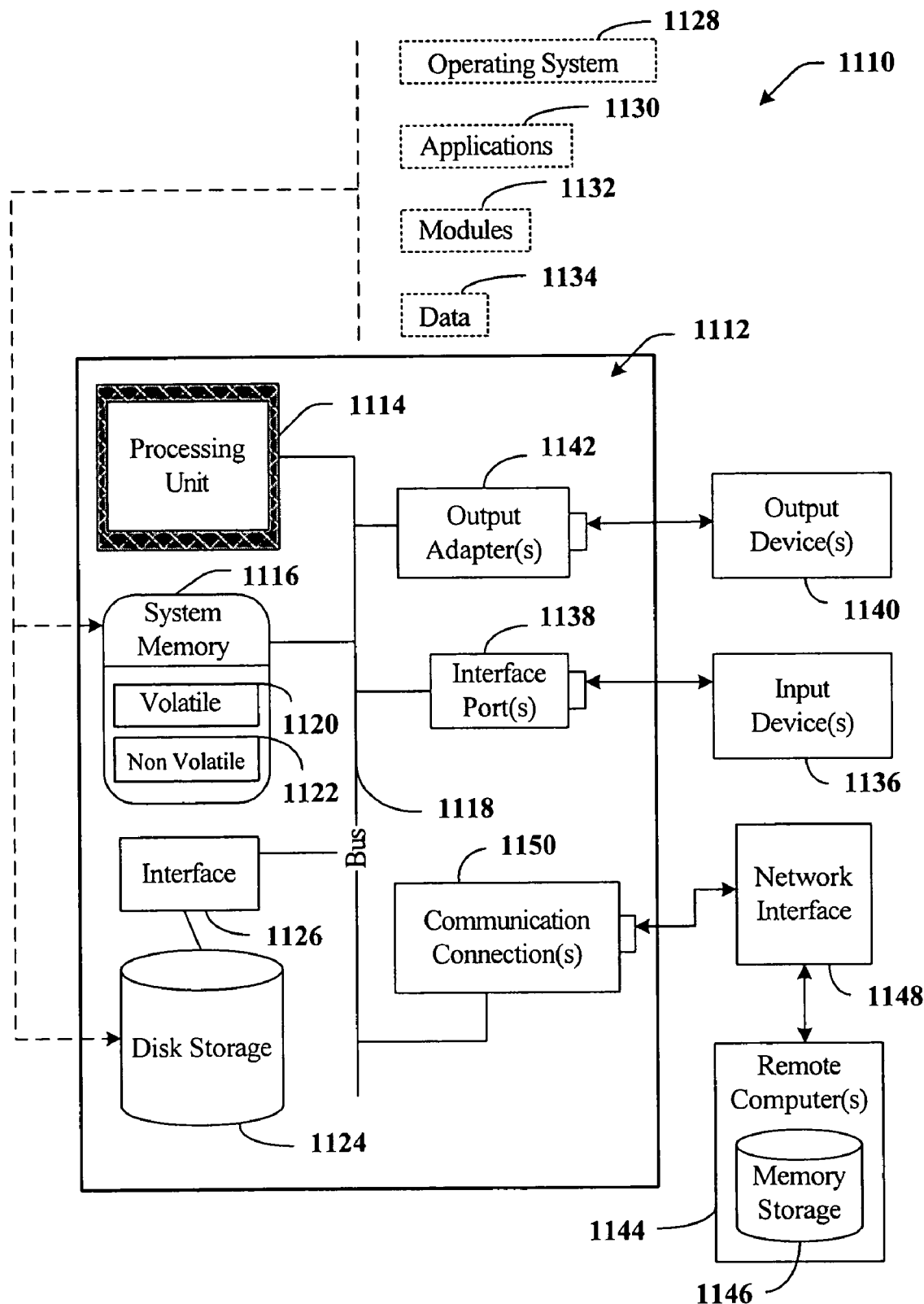
FIG. 11 is a schematic block diagram illustrating a suitable operating environment in accordance with an aspect of the present invention.
Figure 12:
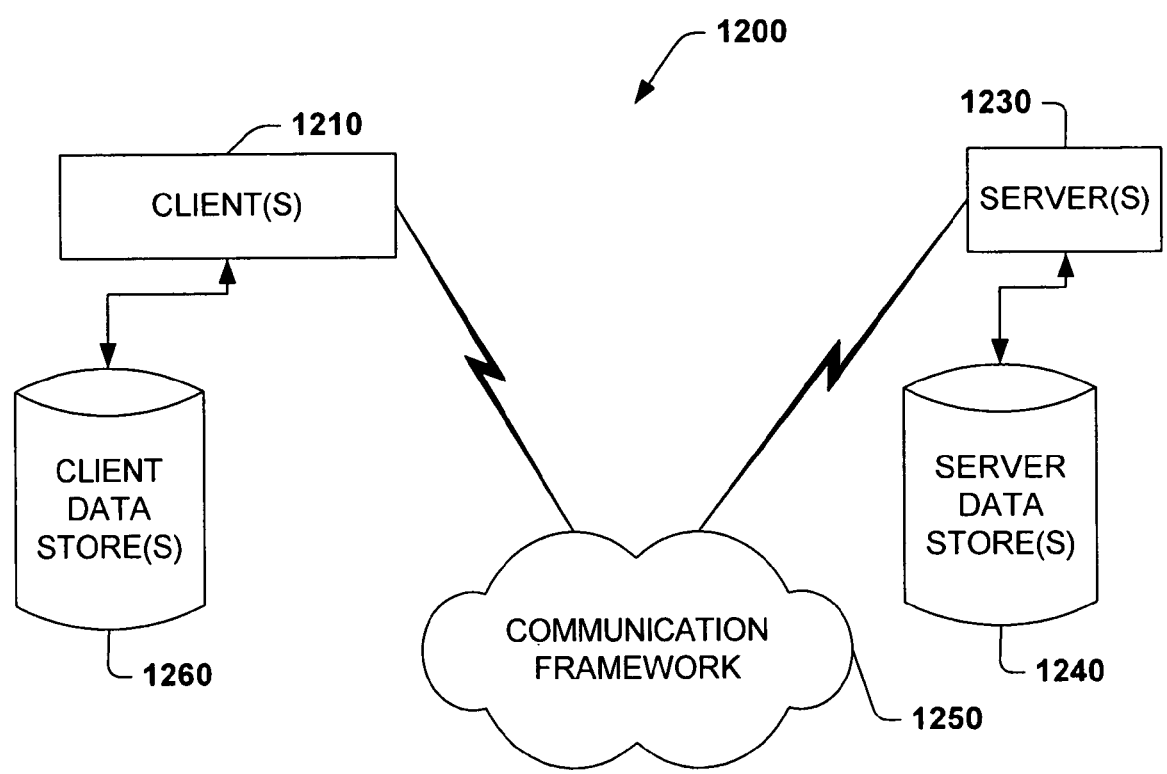
FIG. 12 is a schematic block diagram of a sample-computing environment with which the present invention can interact.

In order to provide a context for the various aspects of the invention, FIGS. 11 and 12 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example disk storage 1124. Disk storage 4124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes. The system 1000 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A network device interaction system in a computing device adapted to connect to a network, the system comprising:
   a registry; and
   a processor configured to execute a plurality of software components, the components comprising:
      an application component adapted to utilize a network device;
      a monitor component that detects arrival and departure of the network device on the network by passively listening for the network device, whereby the computing device can determine when the network device is accessible to the application component;
      a configuration component that automatically configures the network device for operation with the application component in response to arrival of the network device being detected by the monitor component, by:
receiving metadata for identifying the network device, the metadata comprising a hardware identifier for the network device;
determining configuration information using the hardware identifier for the network device, the configuration information indicating a configuration of the network device and comprising one or more registry keys; and
configuring the system with the configuration information, the configuring comprising setting, in association with the hardware identifier, the registry with the one or more registry keys from the configuration information;
an association component for forming an association between the computing device and one or more other network devices based on user input and for using stored credential information for re-authenticating with a network device of the one or more other network devices to automatically re-associate the network device with the computing device when the network device re-arrives on the network; and
a display component that displays to a user of the computing device an interface indicating associated network devices, the interface, based on an output of the monitoring component, selectively including a representation of the network device in a format that distinguishes between when the network device is available and when the network device is not available,
wherein the association between the computing device and the one or more other network devices is formed using a credential.

2. The system of claim 1, wherein the configuration information further comprises a device driver associated with the network device, and configuring the system further comprises loading the device driver.

3. The system of claim 2, wherein the device driver is loaded from a local data store or is downloaded over the Internet.

4. The system of claim 2, wherein the device driver is received from the network device.

5. The system of claim 2, wherein the device driver is retrieved from a computer readable medium.

6. The system of claim 2, wherein the device driver is retrieved from a computer over a local area network.

7. The system of claim 2, wherein configuration of the network device further comprises updating device firmware to a newer firmware version packaged with the device driver.

8. The system of claim 2, wherein configuration of the network device further comprises writing a copy of a most recent or current device driver package onto the network device.

9. The system of claim 1, wherein configuring the system comprises setting the registry with the one or more registry keys, the one or more registry keys indicating a user preference.

10. The system of claim 1, wherein:
the interface selectively includes a representation of the network device by displaying a ghosted icon of the device when the output of the monitoring component indicates that the network device is not accessible on the network.

11. The system of claim 10, wherein:
the interface displays representations of a set of network devices that have associated with the computing device.

12. A method of configuring a network device on a network for use with at least one other network device installed on the network, wherein the network device is a computer peripheral and the at least one other network device comprises a computer, the method comprising:
receiving, through a user interface on the computer, information defining a credential;
associating the computer peripheral with the computer at least by authenticating between the computer peripheral and the computer using the credential;
in response to authenticating with the computer peripheral, storing information for re-authenticating with the computer peripheral;
locating a driver component associated with the computer peripheral;
retrieving the driver component;
loading the driver component to facilitate installation of the computer peripheral;
detecting that the computer peripheral is no longer on the network; and
using the stored information for re-authenticating with the computer peripheral to automatically re-associate the computer peripheral with the computer when the computer peripheral is reconnected to the network.

13. The method of claim 12, wherein locating a driver component comprises searching a local data store of the computer.

14. The method of claim 12, wherein locating a driver component comprises searching a remote server.

15. The method of claim 14, wherein searching a remote server is accomplished over the Internet.

16. The method of claim 12, wherein the driver component is retrieved from the computer peripheral.

17. A computer readable medium having stored thereon computer executable instructions for carrying out the method of claim 12.

18. The method of claim 12, wherein the credential is an identification string and authenticating comprises receiving the identification string through the user interface.

19. The method of claim 12, wherein the credential is a certificate-based credential and authenticating comprises employing the certificate-based credential.

20. The method of claim 12, further comprising establishing a secure, authenticated communications channel.

21. The method of claim 20, further comprising encrypting communications between the computer peripheral and the at least one other network device over said communications channel.

22. The method of claim 12, further comprising:
receiving metadata from the network device, wherein the metadata is used in locating the driver component associated with the computer peripheral.

23. The method of claim 12, further comprising detecting the computer peripheral on the network.

24. The method of claim 23, wherein detecting comprises searching for the network device utilizing Simple Service Discovery Protocol (SSDP).

25. The method of claim 23, wherein detecting comprises searching for the network device utilizing Web Services Discovery (WS-Discovery) Protocol.

26. The method of claim 23, wherein detecting comprises passively receiving a notification from the computer peripheral that it is connected to the network.

27. The method of claim 12, further comprising updating device firmware to a newer firmware version packaged with the device driver.

28. The method of claim 12, further comprising setting one or more registry keys with configuration information for the computer peripheral.

29. The method of claim 12, further comprising storing the credential on a computer-storage medium.

30. A computer-readable storage medium comprising computer-executable instructions that, when executed, perform a method of configuring a computer peripheral on a network for use with a computer on the network, the method comprising:

receiving metadata for identifying the computer peripheral, the metadata comprising an identifier for the computer peripheral;

obtaining a credential based on user input received through a user interface on the computer;

associating the computer peripheral with the computer at least by authenticating the computer peripheral with respect to the computer using the credential;

determining configuration information for the computer peripheral using the identifier, the configuration information comprising driver files and one or more registry keys; and configuring the computer peripheral with the configuration information, the configuring comprising:

setting the one or more registry keys in a registry of the computer and in association with the identifier; and loading the driver files onto the computer; and accessing the computer peripheral using channel security; and using stored credential information for re-authenticating with the computer peripheral to automatically re-associate the computer peripheral with the computer when the computer peripheral is reconnected to the network.

\* \* \* \* \*